June 23, 1936.  G. W. PENNEY  2,045,405

COMMUTATOR

Filed May 4, 1934

WITNESSES:
C. J. Weller.
Fred C. Wilhelm

INVENTOR
Gaylord W. Penney.
BY Ezra W. Savage
ATTORNEY

Patented June 23, 1936

2,045,405

UNITED STATES PATENT OFFICE 2,045,405

COMMUTATOR

Gaylord W. Penney, Pittsburgh, Pa., assignor to Westinghouse Electric & Manufacturing Company, East Pittsburgh, Pa., a corporation of Pennsylvania Application May 4, 1934, Serial No. 723,911

6 Claims. (Cl. 171—320)

The invention relates generally to commutators for dynamo-electric machines, and more particularly to the mounting of the commutator bars.

The object of the invention is to provide for mounting the bars of a commutator of dynamo-electric machines in a manner to permit expansion and contraction of the bars upon changes in temperature without imposing great stresses on the structure or unbalancing the machine.

The invention accordingly is disclosed in the embodiment thereof shown in the accompanying drawing, and comprises the features of construction, combination of elements, and arrangement of parts which will be exemplified in the construction hereinafter set forth, and the scope of the application of which will be indicated in the claims.

Figure 1:
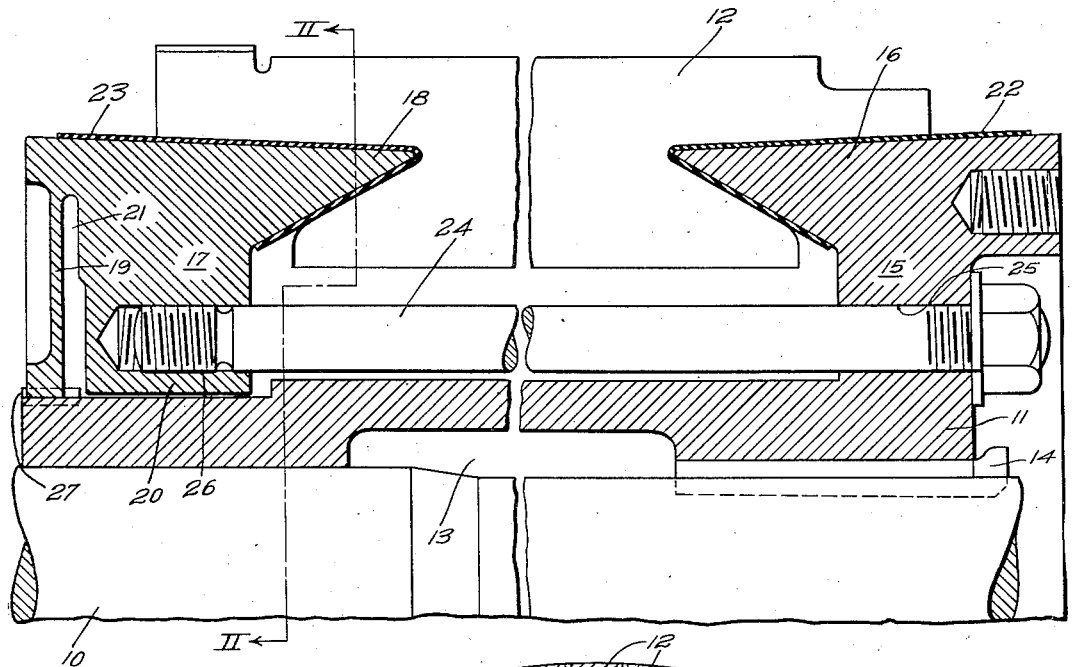
Figure 2:
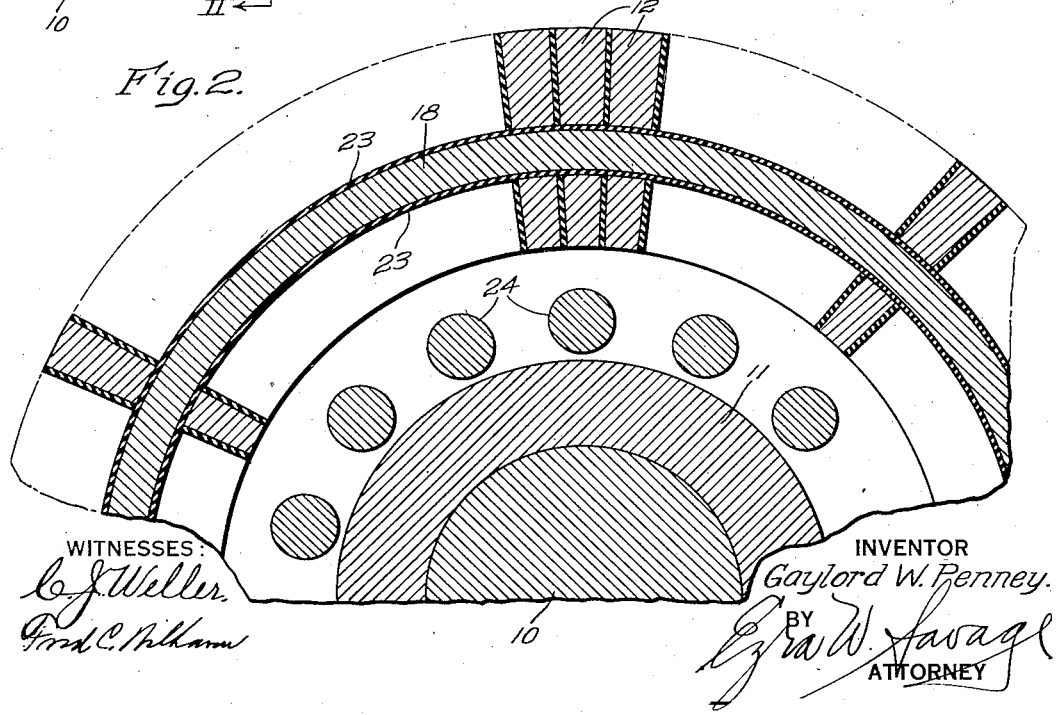

For a fuller understanding of the nature and objects of the invention, reference may be had to the following detailed description taken in conjunction with the accompanying drawing, in which:

Figure 1 is a view in longitudinal section of a commutator constructed in accordance with this invention; and Fig. 2 is a view in end elevation of the structure illustrated in Fig. 1.

Referring now to the drawing, 10 designates generally the end of the shaft of a dynamo-electric machine. As illustrated, the shaft is not of the same diameter throughout. When the end of the shaft is made smaller than the remainder it facilitates the mounting of the commutator structure to be described hereinafter.

A bush 11 made from some metal, such as steel, having the required strength for carrying the commutator bars 12 is mounted on the shaft 10. The central portion of the bush, as shown at 13, is cut away in order to facilitate the mounting of it on the shaft. As shown, a key 14 engages in grooves provided in the shaft 10 and bush 11 and locks them together.

An outer ring 15, which has a substantially V-shaped inwardly extending projection or flange 16, is carried by the bush 11. The ring gets its name from this V-shaped projection. The making of the ring integral with the bush gives great rigidity to this end of the structure.

Another V-ring shown generally at 17 is mounted upon the other end of the bush. This inner V-ring 17 is also provided with an inwardly extending V-shaped flange or projection 18, and for this reason this member is also called the V-ring. At the end of the ring 17 opposite the projection 18, a flexible resilient annular plate or other member 19 is provided for supporting the ring 17 on the bush 11. Between the member 19 and the V-shaped flange 18 is an inwardly extending flange 20, the function of which will appear hereinafter. As illustrated, there is a clearance between the inwardly extending flange 20 and the bush 11.

As illustrated, the V-ring 17 is quite a different structure from the V-ring 15. In constructing the V-ring 17, it may first be rolled or cast as a solid annular member of predetermined shape. Then a deep radial groove 21 is cut therein a predetermined distance from the end to produce the plate 19 which will be made of a predetermined thickness depending on the conditions to be met. The ring is made from some suitable material, such as steel, and the plate 19 may be deflected when subjected to axial forces but is rigid to radial forces.

The commutator bars 12 have annular grooves in the opposite sides for receiving the V-shaped flanges or projections 16 and 18 of the V-rings 16 and 17, respectively. In mounting the commutator bars 12, insulating members 22 and 23 are disposed between them and the V-shaped projections 16 and 18. In this manner, the commutator bars are properly insulated from the bush and machine frame.

In the present structure, the tails of the commutator bars are spaced from the bush. Screw bolts 24, which extend through openings 25 in the ring 15 and make threaded engagement in threaded openings 26 provided in the rings 17, tie the commutator rings together, giving a rigid structure. As shown, there is a wide air gap between the commutator bars and the bolts 24. The air gap is sufficient to prevent any flashing across between the commutator bars and the bolts.

In the operation of the dynamo-electric machine, if the temperature of the commutator is increased, the bars 12 will expand, and since they are usually made of copper or a composition having copper as its main constituent, they will expand more rapidly than the bush and V-rings which are generally made of steel in order to get the required strength for a predetermined weight. Stresses will be imposed on the rings 15 and 17. In the present structure, when the bars 12 expand, the flexible resilient member or plate 19 will be deflected permitting an outward movement of the outer portion of the ring.

From the foregoing, it will be clear that the ring 17 will move freely when subjected to a predetermined stress. Further, in view of the resiliency of the plate or member 17, the V-projection 18 will be maintained in tight engagement with the commutator bars 12 at all times.

As shown, the inner portion of the plate or flange 19 is wider than the body portion. It is constructed in this way in order to give sufficient bearing surface for mounting on the bush 11. The member 19 is the only portion of the ring that engages the bush 11, and in constructing the commutator, it would preferably be mounted on the bush 11 by making a press fit. A key 27 is provided to prevent angular movement of the ring 17 on the shaft 18.

An advantage of the present structure is that only two parts of it have to be carefully machined. It may be readily and quickly assembled. The commutator may be removed from the shaft by drawing it endwise. After the commutator has been removed from the machine, the V-ring 17 may be withdrawn to give access to the structure without removing the commutator bars or disturbing the insulation between them.

Since certain changes may be made in the above construction and different embodiments of the invention could be made without departing from the scope thereof, it is intended that all matter contained in the above description or shown in the accompanying drawing shall be interpreted as illustrative and not in a limiting sense.

I claim as my invention:

1. A commutator structure for mounting on the shaft of a dynamo-electric machine comprising, in combination, a bush disposed on the shaft, an outer V-ring carried by the bush, an inner V-ring, commutator bars disposed between the rings, a flexible annular member mounted on the bush carrying the inner ring in oppositely disposed relation to the outer ring, the inner ring being supported spaced from the bush, the flexible annular member permitting movement of the inner ring as the commutator bars expand and contract upon changes in temperature, and means disposed to tie the rings to one another.

2. In a commutator structure for mounting on a shaft of a dynamo-electric machine comprising, in combination, a bush mounted on the shaft, an outer V-ring carried by the bush, the outer V-ring having openings extending axially therethrough, an inner V-ring, the inner V-ring having axially extending threaded openings, commutator bars disposed between the rings, a flexible annular member mounted on the bush carrying the inner ring, the inner ring being supported spaced from the bush, the flexible annular member permitting movement of the inner ring as the commutator bars expand and contract upon changes in temperature and bolt screws extending through the openings in the outer ring and engaging in the threaded openings in the inner ring to tie the rings to one another.

3. In a commutator structure for mounting on the shaft of a dynamo-electric machine comprising, in combination, a bush carried by the shaft, an outer V-ring made integral with the bush, the outer V-ring having openings extending axially therethrough, a flexible annular member carried by the bush, an inner V-ring centered by the annular member, the inner diameter of the inner V-ring being greater than the outer diameter of the bush to facilitate movement of the inner V-ring relative to the bush, the annular member having an opening therethrough for receiving the bush, the axial length of the surface defining the opening in the annular member being small to facilitate the mounting and removal of the annular member, the inner V-ring having threaded openings disposed with alinement in the openings in the outer V-ring, screw bolts extending through openings in the outer V-ring and engaging in the openings in the inner V-ring for tying the rings together, and commutator bars disposed between the V-rings and insulated therefrom.

4. A commutator structure for small dynamo-electric machines comprising, in combination, a bush, an outer V-ring carried by the bush, the outer V-ring having openings extending axially therethrough, the inner V-ring disposed to aline with the outer V-ring, a flexible member disposed to carry the inner V-ring, the flexible member having an overall diameter substantially that of the commutator, the V-ring being connected to the flexible member near its outer circumference to take advantage of the full radial dimension of the flexible member, the flexible member having an opening therethrough for receiving the bush, the axial length of the surface defining the opening in the annular member being small to facilitate the mounting and the removal of the annular member, the inner V-ring having openings disposed in alinement with the openings in the outer V-ring and having an inner diameter greater than the outer diameter of the bush, screw bolts extending through the openings in the outer V-ring and engaging in the threaded openings in the inner V-ring for tying the rings together and commutator bars disposed between the V-rings and insulated therefrom.

5. In a commutator structure for small dynamo-electric machines, in combination, a bush, a flexible member mounted on the bush, and a V-ring carried by the flexible member, the V-ring member and flexible member being mechanically connected near their outer circumferences to take advantage of the full radial length of the flexible member to give flexibility to the structure, the axial length of the portion of the flexible member which engages the bush being small to facilitate mounting and removal of the flexible member.

6. In a commutator structure for mounting on the shaft of a dynamo-electric machine, in combination, a bush carried by the shaft, a flexible member disposed on the bush, the axial length of the portion of the flexible member engaging the bush being short to facilitate the mounting and removal of said member, and a V-ring spaced from the flexible member, said flexible member and V-ring being mechanically connected to take advantage of the full radial length of the flexible member to give flexibility to the structure, the V-ring being of greater diameter than the bush to permit axial movement as the flexible member is flexed as the commutator changes in size with changes in temperature.

GAYLORD W. PENNEY.